United States Patent [19]
Jackson et al.

[11] 3,741,673
[45] June 26, 1973

[54] MODULAR MILLING MACHINE

[75] Inventors: William J. Jackson, Tamworth; Hubert Busby, Birmingham, both of England

[73] Assignee: Cincinnati Milacron Inc., Cincinnati, Ohio

[22] Filed: Apr. 21, 1971

[21] Appl. No.: 136,049

[30] Foreign Application Priority Data
Apr. 22, 1970  Great Britain............... 19,202/70

[52] U.S. Cl. .................................. 408/234, 90/19
[51] Int. Cl. ..................... B23b 47/00, B23c 1/00
[58] Field of Search .................. 90/11 R, 19, 18; 408/234, 20

[56] References Cited
UNITED STATES PATENTS

| | | | |
|---|---|---|---|
| 2,028,727 | 1/1936 | Perry et al. ........................ | 29/26 |
| 2,110,295 | 3/1938 | Graves ............................... | 90/11 R |
| 1,976,107 | 10/1934 | Archea .............................. | 90/17 |

FOREIGN PATENTS OR APPLICATIONS

| | | | |
|---|---|---|---|
| 941,223 | 12/1949 | France ............................... | 90/18 |

*Primary Examiner*—Gil Weidenfeld
*Attorney*—Howard T. Keiser and Jack J. Earl

[57] ABSTRACT

A modular design of a milling machine structure to permit either a vertical spindle arrangement or a horizontal spindle arrangement to be provided from the same basic structural units or modules. Thus, the same base, column, knee and spindle carrier can be employed in either a vertical or horizontal spindle machine, the former additionally including a head member.

3 Claims, 3 Drawing Figures

MODULAR MILLING MACHINE

BACKGROUND OF THE INVENTION

This invention relates to machine tools of the kind which include a base, a column extending upwardly from the base, and a spindle rotatably supported on the column for carrying a rotatable cutting tool above the base.

Generally, such machine tools also have a knee mounted on the column for movement relative thereto upwardly and downwardly. Examples of machine tools of the kind referred to include knee and column milling machines and knee and column drilling machines.

Normally, machine tools of the kind referred to are constructed either with the spindle arranged for rotation about a vertical axis, or with the spindle arranged for rotation about a horizontal axis, these two varieties commonly being referred to as vertical machines and horizontal machines, respectively.

Hitherto the two varieties of machine tool have been constructed with columns of different form. The column of a vertical spindle machine generally includes an integral head portion which projects forwardly from an upper end of the column proper to support the spindle with its axis spaced from a forwardly presented face of the column proper; whereas the column of a horizontal spindle machine does not include such a head portion.

SUMMARY OF THE INVENTION

On object of the present invention is to reduce the cost of manufacturing machine tools of the kind referred to by providing a vertical spindle machine and a horizontal spindle machine with columns of the same form.

Another object of the invention is to provide a machine tool comprising a base, a column extending upwardly from the base, and a spindle carrier, these parts being formed for assembly into two alternative structures, in the first of which the spindle carrier is mounted directly on the column at an upper end thereof and is arranged for supporting a spindle for rotation about a horizontal axis, and in the second of which the structure further includes a head member mounted on the column at the upper end thereof, the carrier in this case being mounted on the head member and being arranged for supporting the spindle for rotation about a vertical axis.

Thus, the same base, column and spindle carrier can be employed in either a vertical spindle machine or a horizontal spindle machine, the former additionally including the head member.

A further feature of conventional horizontal spindle machines is that a transmission means (usually a gear box) which is operative to transmit torque from a drive motor to the spindle is normally disposed within the column, the latter being hollow and formed with an aperture in a side wall to provide the the necessary access to the interior of the column. The provision of such an aperture reduces the torsional rigidity of the column and hence reduces the accuracy with which the cutting tool can be positioned when the column is subjected to a torsional load.

Accordingly, it is a further object of the present invention to provide a machine tool of the kind referred to wherein the column has improved torsional rigidity relative to known machines.

This purpose may be accomplished through the provision of a machine tool comprising a base, a column extending upwardly from the base and having an upwardly presented opening at its upper end, and a spindle carrier mounted on the column at the upper end thereof and having transmission means extending into the column through said opening for transmitting drive to a spindle supported by the spindle carrier. With this construction it is not necessary to provide an aperture in a side wall of the column for insertion of the gear box into the column.

The invention will now be described by way of example with reference to the accompanying drawings, wherein.

DESCRIPTION OF THE PREFERRED EMBODIMENT

Figure 1:
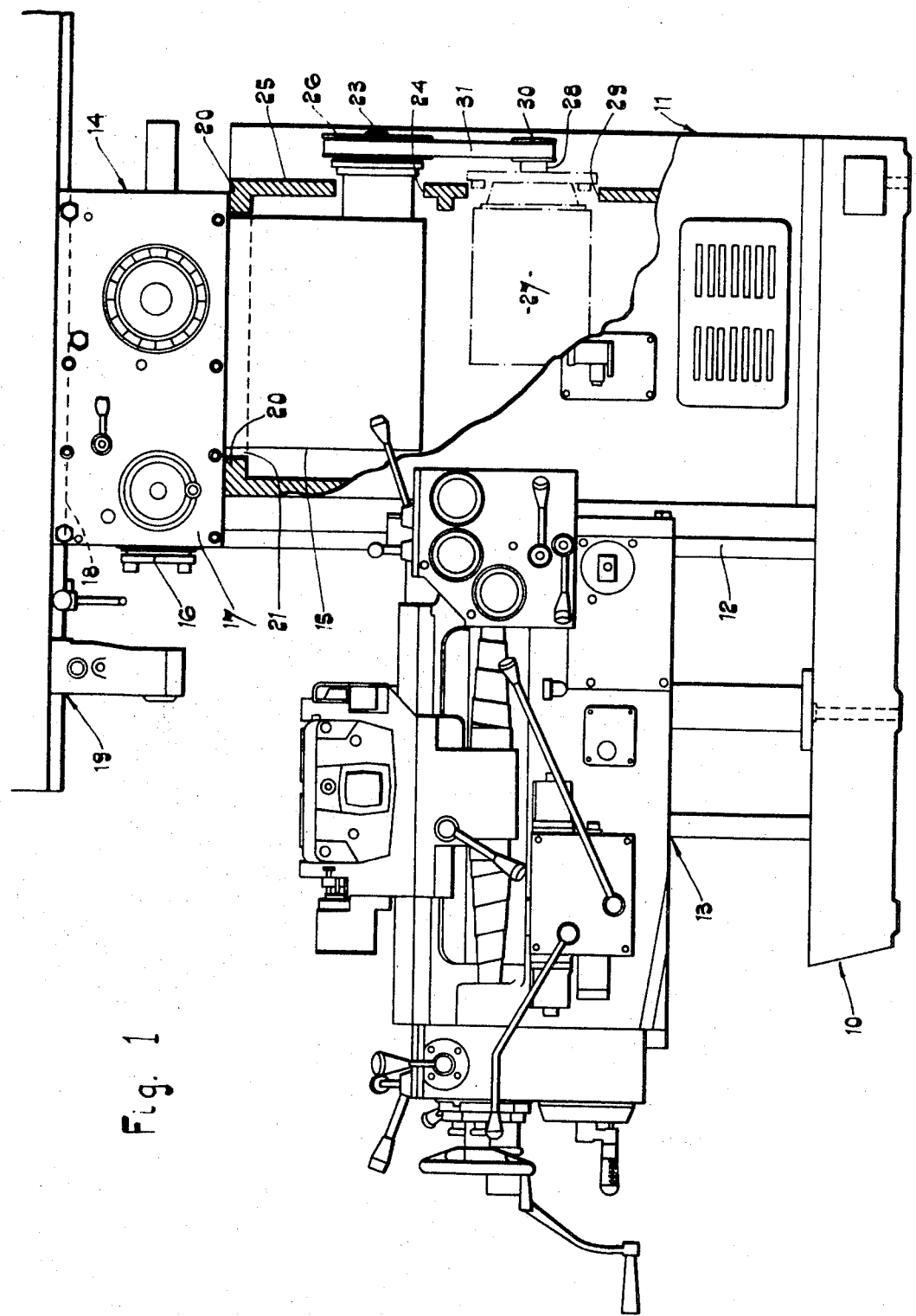
FIG. 1 is a side elevation of a horizontal spindle machine tool embodying the present invention with a part only of an over-arm being shown, and a side wall of the column being broken away to show a top and rear wall thereof in section.

The machine tool illustrated in FIG. 1 includes a horizontal base 10 and a column 11 extending upwardly therefrom. For convenience of manufacture, the base and column are formed separately and secured rigidly to one another by bolts, by welding or in any other convenient manner. They could, however, be integral with each other.

A vertical slideway 12 is provided on a front face of the column 11 for co-operation with a knee 13 which is slidable upwardly and downwardly on the column. The knee carries a saddle and work table which are arranged to provide for traversing movement of the work table in one direction towards and away from the column and in another direction laterally of the column. The knee and parts carried thereon may be of conventional construction and therefor will not be described in detail.

A spindle carrier indicated generally at 14 is mounted on the column 11 at the upper end thereof. The spindle carrier comprises a hollow casting which is of T shape when viewed in side elevation, the stem of the T forming a gear box casing 15 and a spindle 16 being supported in a spindle casing 17 which forms the cross-bar of the T. It will be understood that the spindle casing and gear box casing are formed as a single unit.

The spindle 16 is supported in the carrier 14 for rotation about a horizontal axis. A slideway 18 is formed on an upwardly presented face of the carrier and an over-arm 19 for supporting an outer end of an arbor mounted in the spindle cooperates with this slideway.

Figure 2:
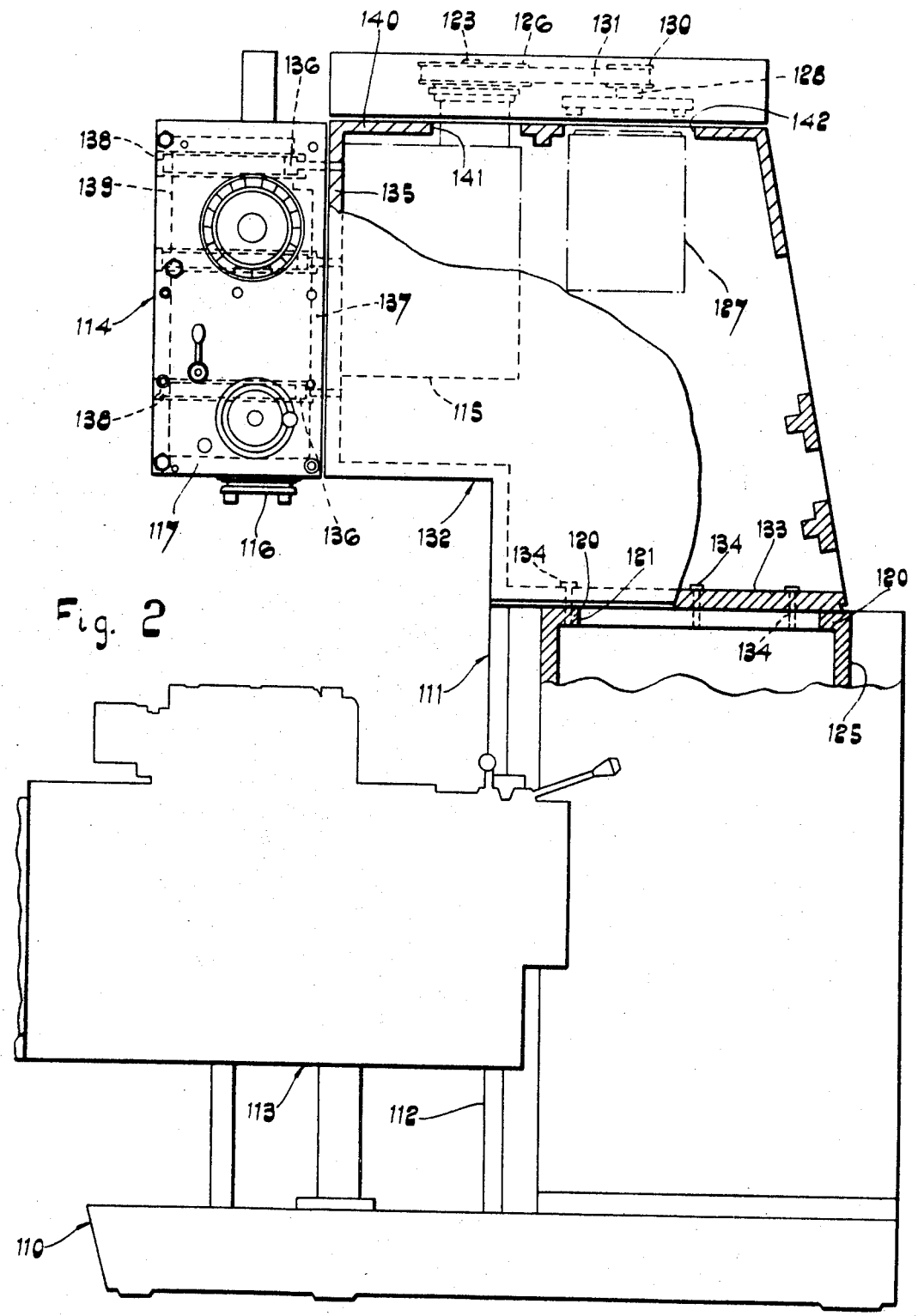
FIG. 2 is a side elevation of a vertical spindle machine tool embodying the present invention, with the knee and parts carried thereon being shown in outline only, and with a side wall of the head member and column being partly broken away to show the top and rear walls thereof in section.
Figure 3:
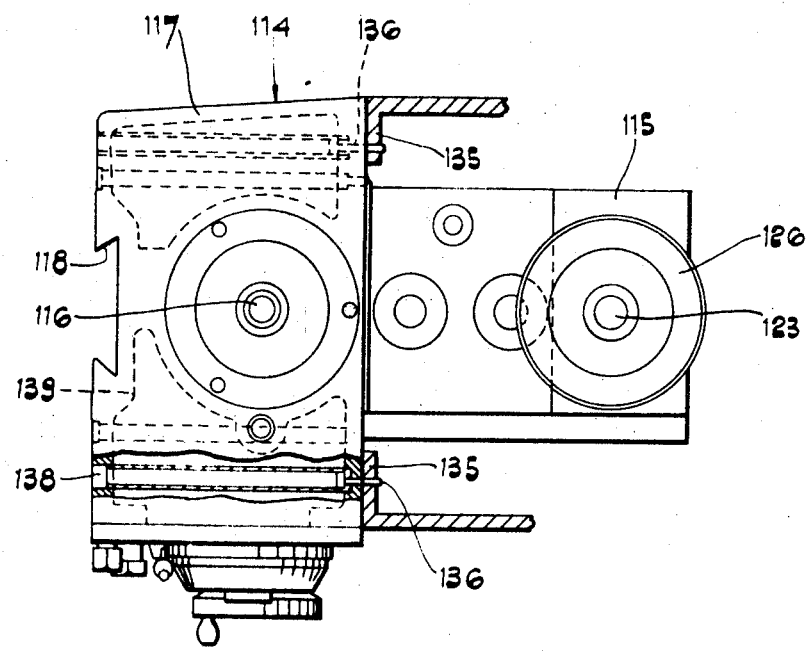
FIG. 3 is a fragmentary plan view, partly in section, of the machine tool of FIG. 2 showing the spindle carrier and an adjacent part of the head member.

The spindle carrier 14 is mounted on the flat upper end face of the column 11. This upper end face is provided by flanges 20 formed on top of the side walls of the column. These flanges define an opening 21 in the upper end of the column for receiving the gear box casing 15. The upper end face of the column cooperates with a downwardly presented face of the spindle casing 17, this downwardly presented face surrounding the gear box casing 15 and also being ground flat. The carrier is located with respect to and secured to the column by pin means which comprises dowels (not shown) which extend from bores formed in the carrier into aligned bores formed in the flanges 20, and bolts which extend through unthreaded apertures in a lower wall of the carrier into aligned threaded apertures formed in the flanges 20. The carrier shown in FIG. 1 is secured to the column in a manner exactly analogous to that in which the carrier shown in FIGS. 2 and 3 is secured to the head member and reference should be made to FIGS. 2 and 3 and to the description which refers thereto for further details.

The gear box casing 15 extends into the interior of the column 11 through the opening 21 and is supported indirectly from the flanges 20 through the intermediary of the spindle casing 17. A drive shaft 23 projects from the gear box through an opening 24 in the rear wall 25 of the column and carries at its outer end a pulley 26.

An electric motor 27 is disposed within the column 11 below the gear box casing 15 and is attached to the rear wall 25. A drive shaft 28 projects from the motor through a further opening 29 in the rear wall 25 and a further pulley 30 is provided on the outer end of the drive shaft 28. The pulleys 26 and 30 are interconnected by a drive bolt 31 so that torque can be transmitted from the motor 27 through the belt and pulleys to the gear box and thence to the spindle 16.

The gear box 15 is inserted into the column 11 through the opening 21 in the upper end thereof. It will thus be apparent that it is not necessary to provide in a side wall of the column an opening of a sufficient size to permit of insertion of the gear box. Thus, a column having improved rigidity, as compared with conventional columns, is provided without employing a greater quantity of metal for its construction.

Referring now to FIGS. 2 and 3, the parts corresponding to those previously described with reference to FIG. 1 are indicated by like reference numerals with the prefix 1 and the preceding description is deemed to apply.

The vertical spindle machine illustrated in FIGS. 2 and 3 comprises a base 110 and a column 111, the respective forms of which are substantially identical with the base and column of the horizontal spindle machine. The knee 113 and the parts carried thereon may also be identical with the knee and associated parts of the horizontal spindle machine.

The casting from which the gear box casing 115 and spindle casing 116 are formed is identical with the casting used for the spindle carrier 14, but the finished spindle carrier may differ in some respects, for example since an overarm is not normally provided on a vertical spindle machine, it is not necessary for a slideway corresponding to the slideway 18 to be machined on the spindle carrier 114.

The upper end of the column 111 is constituted by flanges 120 which define an opening 121 in the top of the column. These flanges are identical with the flanges 20 and provide a flat surface on the upper end face of the column as is the case with the column 11.

A head member 132 is mounted on the column at the upper end thereof in a manner exactly analogous to that in which the spindle carrier 14 is mounted on the column 11. The head member 132 is hollow and includes a bottom wall 133, the downwardly presented face of which is flat for cooperation with the flat upper end face of the column 111.

The head member 132 is located on the column 111 by pin means comprising dowels (not shown) which project from bores formed in the bottom wall 133 into aligned bores formed in the flanges 120, and bolts 134 which extend through unthreaded apertures in the bottom wall 133 into threaded apertures in the flanges 120, or alternatively through unthreaded apertures in the flanges 120 to engage nuts disposed at the underside thereof. As shown in FIG. 2, the heads of the bolts 134 engage the upwardly presented face of the bottom wall 133.

The head member 132 is of approximately L shape when viewed in side elevation, the end of one limb of the L being constituted by the bottom wall 133 and the end of the other limb being defined by a front wall 135 which extends in a vertical plane spaced somewhat forwardly of the slideway 112 formed on the front face of the column 111. The form of the front wall 135 is similar to that of the upper end face 120 of the column. Thus, the front wall 135 is constituted by flanges which define a flat surface having an opening for receiving the gear box casing 115.

The spindle carrier 114 is mounted on the head member 132 in a manner analogous to that in which the spindle carrier 14 is mounted on the column 11. As shown in FIGS. 2 and 3, bolts 136 extend through apertures in a rear wall 137 of the spindle carrier and engage in threaded apertures formed in the flanges which constitute the front wall 135 of the head member. Alternatively, the apertures in the head member may be unthreaded and the bolts may engage nuts disposed at the inner face of the front wall. Upper apertures 138 are provided in a front wall 139 of the carrier 114 in alignment with the apertures in the rear wall thereof to afford access to the heads of bolts 136. As indicated in the drawings, guide tubes may be provided within the carrier 114 and extending between the apertures 138 and corresponding apertures in the rear wall. Two or more dowels (not shown) are also provided for locating the spindle carrier with respect to the head member, such dowels extending within aligned apertures in the front wall 135 of the head member and in the rear wall 137 of the carrier. Apertures similar to apertures 138 are provided in the front wall 139 for permitting insertion of the dowels.

The gear box casing 115 extends into the interior of the head member 132 and is supported from the front wall 135 thereof through the intermediary of the spindle casing 117. An electric motor 127 is disposed within the head member rearwardly of the gear box casing and is supported on an upper wall 140 of the head member. The gear box and motor are provided with respective drive shafts 123 and 128 which project through respective apertures 141, 142 in the upper wall of the head member to the exterior thereof. Pulleys 126 and 130 respectively are provided on the outer ends of the drive shafts and are interconnected by a drive belt 131, this arrangement being exactly analogous to that of the horizontal spindle machine.

It will be noted that the respective forms of the spindle carrier and column are such that these members can be employed in either the vertical spindle machine or the horiontal spindle machine. Similarly, the base, knee and parts carried thereon can also be employed in either machine. This provides economy of manufacture of both types of machine since only the head member has to be produced specifically for one type of machine.

What is claimed is:

1. A machine tool comprising a base, hollow supporting column extending upwardly from said base, a hollow, T-shaped spindle carrier housing mounted on said column, the stem of the T forming a gear box casing and the crossbar of the T forming a spindle casing, a spindle journaled in said spindle casing, a gear box having drive means contained in said gear box casing for operating said spindle, and a drive motor in said column drivingly connected to said drive means for transmitting torque thereto and thence to the spindle, a flat end face on the column provided by flanges defining an opening for receiving the gear box casing, and a flat face on said spindle casing surrounding said gear box casing and arranged to cooperate with the flat end face on the column to thereby indirectly support the gear box casing from said flanges through the intermediary of the spindle casing.

2. The machine tool of claim 1 including a hollow L-shaped head member, the end of one limb of the L being constituted by a bottom wall having a flat face formed thereon for cooperation with the flat end face on the column, and the end of the other limb of the L being defined by a front wall constituted by flanges defining a flat surface having an opening for receiving said gear box casing and arranged to cooperate with the flat face on said spindle casing.

3. The machine tool of claim 1 wherein the flat end face on said column is an upwardly directed surface.

* * * * *